(12) United States Patent
Manabe et al.

(10) Patent No.: US 8,268,495 B2
(45) Date of Patent: Sep. 18, 2012

(54) CONTROLLER IN A FUEL CELL SYSTEM THAT CONTROLS THE MEASUREMENT OF AC IMPEDANCE AND DRIVES THE DC/DC CONVERTER

(75) Inventors: Kota Manabe, Toyota (JP); Takeshi Maenaka, Toyota (JP); Takahiko Hasegawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 511 days.

(21) Appl. No.: 12/303,518

(22) PCT Filed: Aug. 16, 2007

(86) PCT No.: PCT/JP2007/066319
§ 371 (c)(1),
(2), (4) Date: Dec. 4, 2008

(87) PCT Pub. No.: WO2008/032537
PCT Pub. Date: Mar. 20, 2008

(65) Prior Publication Data
US 2010/0013490 A1    Jan. 21, 2010

(30) Foreign Application Priority Data

Sep. 11, 2006  (JP) .................................. 2006-245388
Jan. 25, 2007  (JP) .................................. 2007-015105

(51) Int. Cl.
*G01N 27/416*    (2006.01)
(52) U.S. Cl. .......... 429/430; 429/431; 429/432; 324/430
(58) Field of Classification Search .................. 324/430; 429/430, 431, 432
See application file for complete search history.

(56) References Cited

FOREIGN PATENT DOCUMENTS

| JP | 2003-235252 A | 8/2003 |
| JP | 2005-332702 A | 12/2005 |
| JP | 2006-33934 A | 2/2006 |
| JP | 2007-18741 A | 1/2007 |
| JP | 2007-207442 A | 8/2007 |
| WO | WO 2007/004718 A1 | 1/2007 |
| WO | WO 2007/004732 A1 | 1/2007 |

OTHER PUBLICATIONS

English Translation of JP 2005-332702 Dec. 2, 2005.*
Lai, Jason, A High Efficiency Low-Cost DC-DC Converter for SOFC, Feb. 19-20 2003, SECA Core Technology Program Review Meeting.*

* cited by examiner

*Primary Examiner* — Ula C Ruddock
*Assistant Examiner* — Frank Chernow
(74) *Attorney, Agent, or Firm* — Kenyon & Kenyon LLP

(57) ABSTRACT

When the operation point of a DC/DC converter, which steps up/down the output voltage of a fuel cell stack, is in a range of reduction in response capability and further there is issued a request of determining an AC impedance, a controller switches numbers of the drive phases of the DC/DC converter to determine an AC impedance of the fuel cell stack. If the operation point of the DC/DC converter is in the range of reduction in response capability and further the precision of determining the AC impedance is reduced, then the determination of AC impedance in the range of reduction in response capability is inhibited and the switching of the phases of the DC/DC converter is implemented, thereby causing the operation point of the DC/DC converter to be out of the range of reduction in response capability, with the result that the precision of determining the AC impedance can be raised.

4 Claims, 7 Drawing Sheets

US 8,268,495 B2

CONTROLLER IN A FUEL CELL SYSTEM THAT CONTROLS THE MEASUREMENT OF AC IMPEDANCE AND DRIVES THE DC/DC CONVERTER

This is a 371 national phase application of PCT/JP2007/066319 filed 16 Aug. 2007, which claims priority to Japanese Patent Application No. 2006-245388 filed 11 Sep. 2006, and No. 2007-015105 filed 25 Jan. 2007, the contents of which are incorporated herein by reference.

TECHNICAL FILED

The present invention relates to a fuel cell system for measuring an alternating current (AC) impedance of a fuel cell stack by using a DC/DC converter for increasing and lowering an output voltage of the fuel cell stack.

BACKGROUND ART

A fuel cell stack is an energy conversion system that causes an electrochemical reaction by supplying a fuel gas and an oxidation gas to a membrane electrode assembly, and thereby converts chemical energy into electric energy. Among other things, a solid polymer electrolyte fuel cell stack using a solid polymer membrane as electrolyte is low-cost and can be easily made compact, and also has a high power density, so that the application for an on-vehicle power supply is expected.

AC impedance of a fuel cell stack is used as one of indicators for optimally controlling operational states of a fuel cell stack. A value of the AC impedance is in a correlation with a wet condition of an electrolyte membrane, and measurement of the value of the AC impedance can detect the wet condition of the electrolyte membrane. When the electrolyte membrane has excessive or deficient moisture, an output power of the fuel cell stack is lowered due to the flooding phenomenon or the dryout phenomenon, and to optimally control operation of the battery cell, it is necessary to maintain the wet condition of the electrolyte membrane at optimal conditions. Japanese Patent Laid-Open No. 2005-332702 proposed a method that an AC signal be applied to a fuel cell stack by using a DC/DC converter connected to the fuel cell stack, and a frequency of the AC signal is varied to detect a voltage response, and thereby AC impedance is measured.

[Patent Document 1] Japanese Patent Laid-Open No. 2005-332702

DISCLOSURE OF THE INVENTION

However, in a DC/DC converter for increasing and lowering an output voltage of a fuel cell stack by a switching operation of a switching element, there is an operational range in which a dead time compensation value largely changes dependent on a value of passing power. It is known that, in the operational range where the dead time compensation value largely changes (hereinafter, called "lowered response capability region" for convenience), responsibility of the DC/DC converter lowers. When AC impedance of the fuel cell stack is measured in such lowered response capability region, accuracy in which the DC/DC converter superimposes a high-frequency signal on the fuel cell stack lowers, and there is a disadvantage that measurement accuracy of impedance considerably lowers.

Then, an object of the present invention is to solve the above problem and propose a fuel cell system that can accurately measure AC impedance of a fuel cell stack.

To solve the above problem, the fuel cell system according to the present invention is a fuel cell system including a DC/DC converter for increasing and lowering an output voltage of a fuel cell stack formed by laminating a plurality of cells, the fuel cell system being provided with: an alternating current (AC) signal application device that applies an AC signal to the fuel cell stack by driving the DC/DC converter; and an AC impedance measuring device which measures AC impedance of the cell by detecting a response voltage of the cell upon applying the AC signal to the fuel cell stack, when an operating point of the DC/DC converter is outside of the lowered response capability region, and on the contrary, which is inhibited to measure the AC impedance of the cell, when the operating point of the DC/DC converter is inside of the lowered response capability region.

When the operating point of the DC/DC converter is inside of the lowered response capability region, it is preferable that the measurement of the AC impedance be inhibited, because accuracy in which the DC/DC converter superimposes the AC signal on the fuel cell stack lowers.

In a fuel cell system according to another aspect of the present invention, a DC/DC converter is a multiphase converter. An AC impedance measuring device switches the number of drive phases to measure AC impedance of a cell, when an operating point of the DC/DC converter is inside of the lowered response capability region and measurement of AC impedance is requested.

When the operating point of the DC/DC converter is inside of the lowered response capability region and measurement accuracy of the AC impedance lowers, then the measurement of the AC impedance is inhibited in the lowered response capability region, the number of phases of the DC/DC converter is switched, and the operating point of the DC/DC converter is brought out of the lowered response capability region, and thereby the measurement accuracy of the AC impedance can be enhanced.

In a fuel cell system according to still another aspect of the present invention, an AC impedance measuring device shifts a passing power through a DC/DC converter to bring an operating point of the DC/DC converter out of the lowered response capability region, and measures AC impedance of a cell, when the operating point of the DC/DC converter is inside of the lowered response capability region and measurement of the AC impedance is requested.

When the operating point of the DC/DC converter is inside of the lowered response capability region and measurement accuracy of the AC impedance lowers, then the measurement of AC impedance is inhibited in the lowered response capability region, the operating point of the DC/DC converter is moved by power shifting, and the operating point of the DC/DC converter is brought out of the lowered response capability region, and thereby the measurement accuracy of the AC impedance can be enhanced.

In a fuel cell system according to further another aspect of the present invention, an AC impedance measuring device changes a carrier frequency of a control signal for controlling a switching operation of a DC/DC converter to bring an operating point of the DC/DC converter out of the lowered response capability region, and measures AC impedance of a cell, when the operating point of the DC/DC converter is inside of the lowered response capability region and measurement of the AC impedance is requested.

When the operating point of the DC/DC converter is inside of the lowered response capability region and the measurement of the AC impedance is requested, then by changing the carrier frequency of the control signal for controlling the switching operation of the DC/DC converter, the operating point of the DC/DC converter is brought out of the lowered response capability region, and thereby the measurement accuracy of the AC impedance can be enhanced.

BEST MODE FOR CARRYING OUT THE INVENTION

Now, embodiments of the present invention will be hereinafter described with reference to each of the accompanying drawings.

Figure 1:
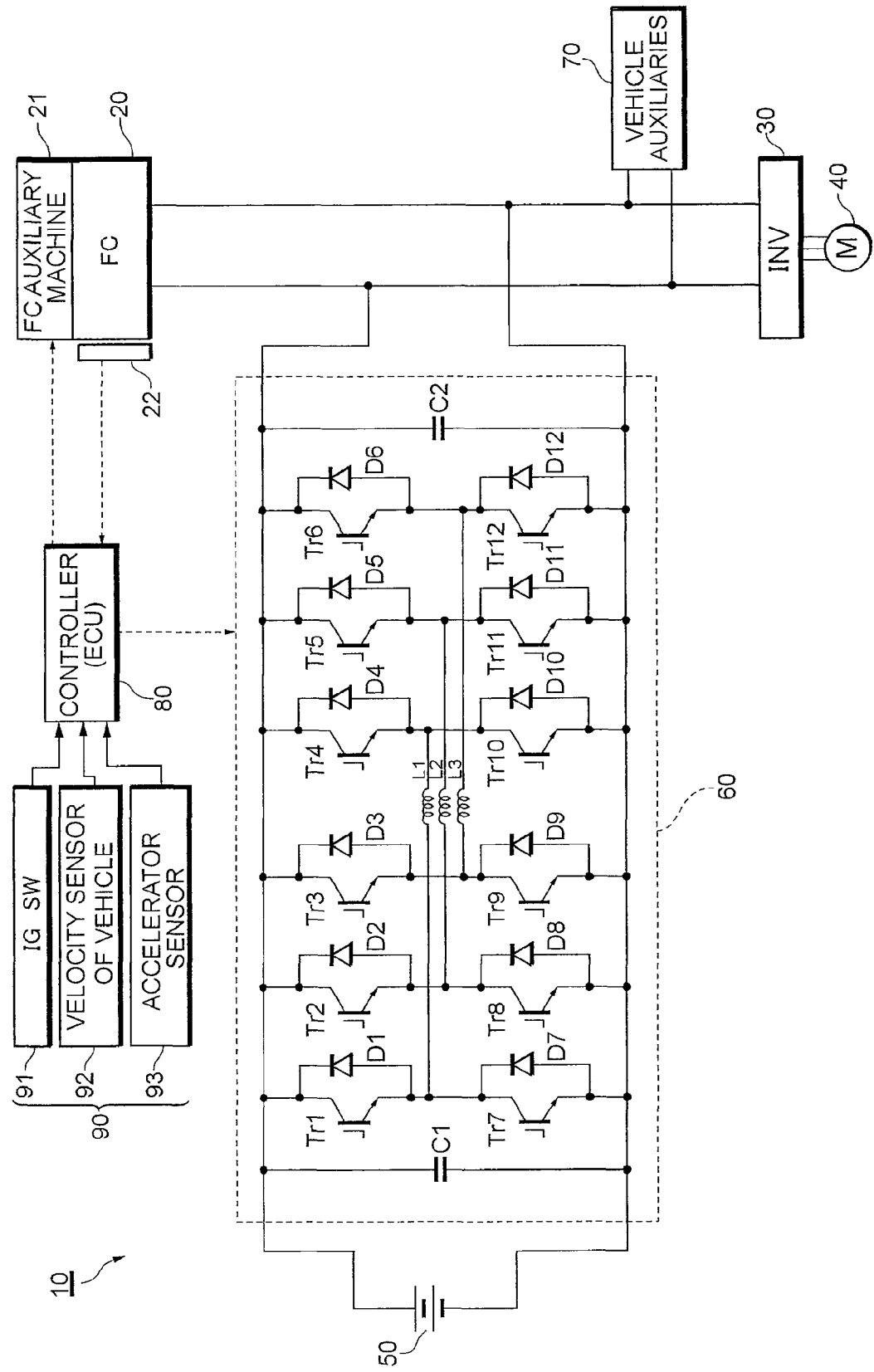
FIG. 1 is a view illustrating a main configuration of a fuel cell system according to the present embodiment.

FIG. 1 illustrates a main configuration of a fuel cell system 10 according to a present embodiment. The fuel cell system 10 is an in-vehicle power supply system mounted in a power supply system of automobiles driven by a fuel battery. The fuel cell system 10 includes a fuel cell stack 20, an FC auxiliary machine 21, a cell voltage detector 22, a traction inverter 30, a traction motor 40, a secondary cell 50, a DC/DC converter 60, vehicle auxiliaries 70, a controller 80, and sensors 90.

The fuel cell stack 20 is a generator having a stack configuration in which a plurality of cells is connected in series, each of the cells being configured by placing a pair of electrodes (an anode pole, a cathode pole) to sandwich a solid polymer electrolyte therebetween. Protons produced in the anode pole from catalyzed reaction pass through a solid polymer electrolyte membrane and move to the cathode pole, and there electrochemically react with an oxidation gas to generate electricity.

The FC auxiliary machine 21 includes: a fuel gas supply system (a hydrogen storage tank, a hydrogen shutoff valve, a hydrogen supply pressure regulator and the like) for supplying a fuel gas (hydrogen gas) to the anode pole of the fuel cell stack 20; an oxidation gas supply system (an air compressor and the like) for supplying an oxidation gas (an air) to the cathode pole of the fuel cell stack 20; and another auxiliaries (a humidification module for humidifying the fuel gas and the oxidation gas, a fuel cell cooler and the like).

The fuel cell stack 20 receives the fuel gas and the oxidation gas supplied from the FC auxiliary machine 21, and outputs electric energy using electrochemical reaction.

The traction motor 40 is an electric motor to produce travel driving force, and is configured by, for example, a three-phase synchronous motor.

The traction inverter 30 includes, for example, a three-phase bridge circuit composed of six power transistors, and converts direct current (DC) power supplied from the fuel cell stack 20 or the secondary cell 50 into AC power (three-phase current) by using a switching operation of the power transistors to supply to the traction motor 40. The controller 80 has a function for controlling power conversion of the traction inverter 30, and, for example, outputs AC voltage commands respectively for a U-phase, a V-phase and a W-phase to the traction inverter 30 as a switching command and thereby controls output torque and the number of revolutions of the traction motor 40.

The secondary cell 50 is an electric condenser capable of storing and discharging power, and functions as a storage of regenerative energy produced upon regenerative braking, and an energy buffer at load change caused by acceleration or deceleration of a fuel cell vehicle. For the secondary cell 50, for example, a nickel-cadmium battery, a nickel-hydrogen battery, a lithium secondary battery may be suitable.

In addition, instead of the secondary cell 50, an electric condenser of a capacitor (an electric double layer capacitor, an electrolytic capacitor and the like) may be connected to the primary side of the DC/DC converter 60.

The DC/DC converter 60 is a voltage transducer for controlling an output voltage of the fuel cell stack 20 or the secondary cell 50 to increase and lower. The DC/DC converter 60 has a circuit configuration of a multiphase converter formed by combining a circuit similar to an inverter for converting an input voltage (DC voltage) into AC voltage and a circuit for rectifying the AC voltage to convert it into an output voltage (DC voltage). Specifically, the DC/DC converter 60 has a circuit configuration of a three-phase full-bridge converter including: twelve insulated gate bipolar transistor (IGBT) elements Tr1 to Tr12, twelve diode elements D1 to D12; three reactors L1 to L3; and two smoothing capacitors C1 and C2.

When a passing power through the DC/DC converter 60 is low, a single-phase operation has a smaller switching loss than that of a three-phase operation, so that the single-phase operation is carried out. When the single-phase operation is carried out, a pair of the IGBT elements Tr1 and Tr10, and a pair of the IGBT elements Tr4 and Tr7 are operated. On the one hand, when the passing power through the DC/DC converter 60 is high, the three-phase operation has a smaller switching loss than that of the single-phase operation, so that the three-phase operation is carried out. When the three-phase operation is carried out, the pair of the IGBT elements Tr1 and Tr10 and the pair of the IGBT elements Tr4 and Tr7, and a pair of the IGBT elements Tr2 and Tr11 and a pair of the IGBT elements Tr5 and Tr8, and a pair of the IGBT elements Tr3 and Tr12 and a pair of the IGBT elements Tr6 and Tr9 are operated with a 1200 phase difference between each phase.

To the primary side of the DC/DC converter 60, the secondary cell 50 is connected, and on the one hand, to the secondary side of the DC/DC converter 60, the fuel cell stack 20, the traction inverter 30 and the vehicle auxiliaries 70 are connected, each in parallel.

For example, the DC/DC converter 60 increases and lowers an output voltage of the secondary cell 50 to control an operating point (output voltage, output current) of the fuel cell stack 20. The DC/DC converter 60 increases the output voltage of the secondary cell 50 to supply DC power to the traction inverter 30, when a fuel cell vehicle is powered by the traction motor 40 to run, while the DC/DC converter lowers regenerative DC voltage to charge the secondary cell 50, when the fuel cell vehicle is braked by the traction motor 40 to regenerate. The DC/DC converter 60, to store surplus generative power of the fuel cell stack 20, has a function for lowering the output voltage of the fuel cell stack 20 to charge the secondary cell 50.

The vehicle auxiliaries 70 may be various auxiliaries including, for example, a compressor motor to compress the oxidation gas, a pump drive motor for supplying deionized water to the humidification module, a cooling water pump drive motor for cooling the fuel cell stack 20 and a radiator fan motor.

The controller 80 is a control device including a central processing unit (CPU), a memory storage (ROM, RAM), an input/output interface and the like. The controller 80 controls the fuel cell vehicle, based on various signals supplied from the sensors 90. The sensors 90 include, for example, an ignition switch 91, a velocity sensor of vehicle 92, an accelerator sensor 93.

For example, the controller 80 receives an activating signal supplied from the ignition switch 91 to start operation of the fuel cell system 10, and computes a required power of the system in total, based on an accelerator angle signal supplied from the accelerator sensor 93 and a vehicle velocity signal supplied from the velocity sensor of vehicle 92. The required power of the system in total is the sum of a vehicle running power and power for the auxiliaries. The power for the auxiliaries includes, for example, power consumed by in-vehicle auxiliaries (a humidifier, an air compressor, a hydrogen pump, a cooling water circulation pump and the like), power consumed by devices required for vehicle running (a transmission, a wheel controller, a steering system, a suspension system and the like), and power consumed by devices positioned in a crew compartment (an air conditioner, lighting equipment, audio equipment and the like).

Then, the controller 80 determines how to distribute output power of the fuel cell stack 20 and the secondary cell 50, controls the FC auxiliary machine 21 to adjust a reaction gas flow to the fuel cell stack 20 so as to make electric power generation of the fuel cell stack 20 coincide with a target power, and controls the DC/DC converter 60 to adjust the output voltage of the fuel cell stack 20, thereby controlling the operating point (output voltage, output current) of the fuel cell stack 20. Further, the controller 80, so as to achieve a target vehicle velocity corresponding to the accelerator angle, for example, outputs each of the AC voltage commands of the U-phase, the V-phase and the W-phase to the traction inverter 30 as a switching command to control the output torque and the number of revolutions of the traction motor 40.

The DC/DC converter 60, for the purpose of measuring the AC impedance of the fuel cell stack 20, may also function as an AC signal application device for applying an AC signal to the fuel cell stack 20. The cell voltage detector 22 measures a response voltage of each cell when the AC signal is applied to the fuel cell stack 20. The controller 80, while controlling the DC/DC converter 60 to change a frequency of the AC signal applied to the fuel cell stack 20, detects change in the response voltage of each cell by using the cell voltage detector 22, and computes the AC impedance of the fuel cell stack 20.

The response voltage of the fuel cell stack 20 is indicated by E, a response current is indicated by I and the AC impedance is indicated by Z when the AC signal is applied to the fuel cell stack 20, and it is known that the following equations may be formed.

$$E = E_0 \exp j(\omega t + \Phi)$$

$$I = I_0 \exp j\omega t$$

$$Z = E/I = (E_0/I_0) \exp j\Phi = R + j\chi$$

Where, $E_0$ indicates an amplitude of the response voltage, $I_0$ indicates an amplitude of the response current, $\omega$ indicates an angular frequency, $\Phi$ indicates an initial phase, R indicates a resistance component (real number part), $\chi$ indicates a reactance component (imaginary number part), j indicates the imaginary unit, and t indicates time.

Figure 2:
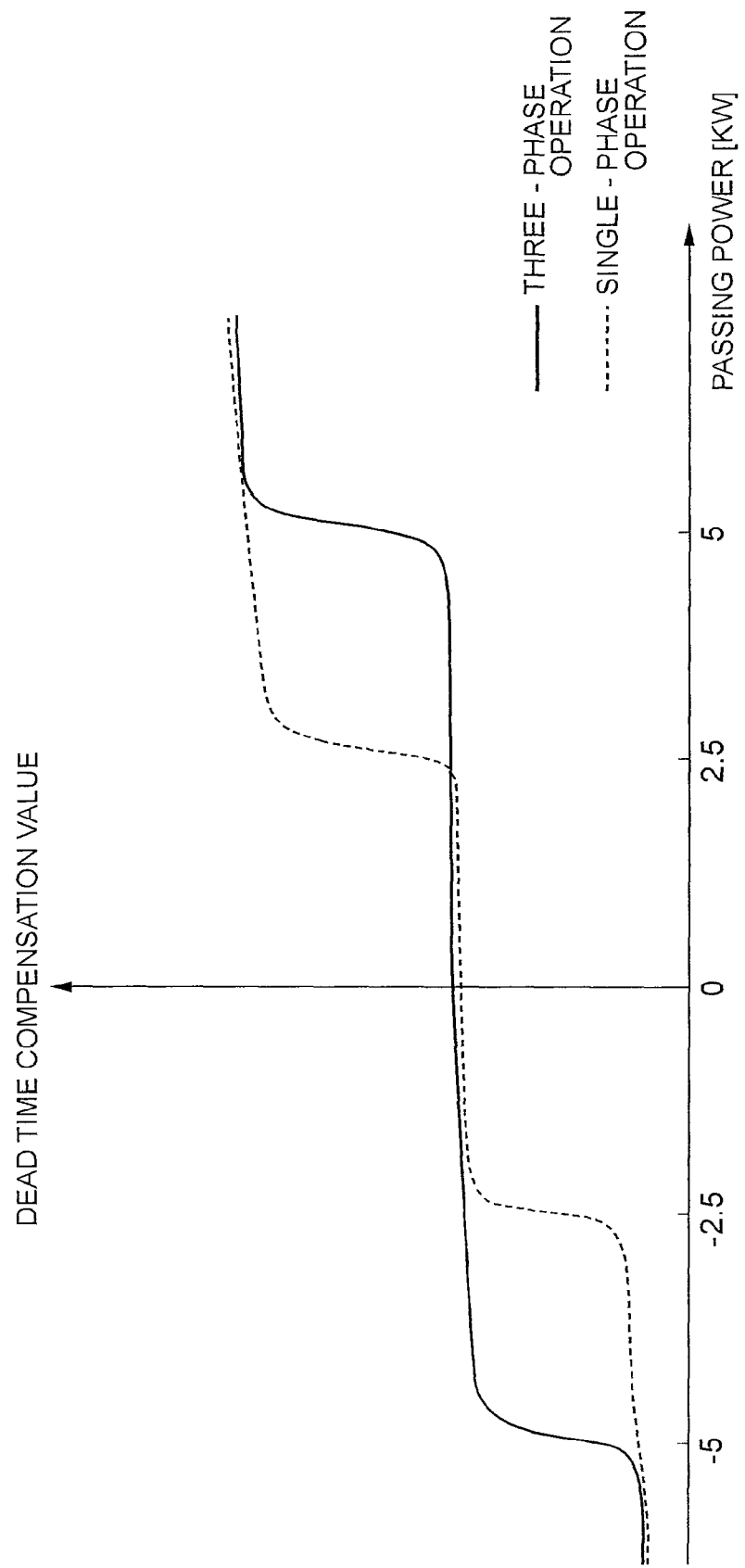
FIG. 2 is a graph illustrating the relation between a passing power and a dead time compensation value of a DC/DC converter.

FIG. 2 is a graph illustrating the relation between the passing power and the dead time compensation value of the DC/DC converter 60. The solid line shows a graph at the three-phase operation, and the dotted line shows a graph at the single-phase operation. At the three-phase operation, the dead time compensation value is largely changed in an operational range in the vicinity of −5 kW (for example, −5 kW±2 kW) and in an operational range in the vicinity of 5 kW (for example, 5 kW±2 kW), and these two operational ranges are the lowered response capability region, respectively. On the one hand, at the single-phase operation, the dead time compensation value is largely changed in an operational range in the vicinity of −2.5 kW (for example, −2.5 kW±2 kW) and in an operational range in the vicinity of 2.5 kW (for example, 2.5 kW±2 kW), and these two operational ranges are the lowered response capability region, respectively.

In addition, the dead time means a period for preventing short-circuiting set so that a short-circuit current does not flow between the IGBT elements on an upper arm side and the IGBT elements on a lower arm side in the DC/DC converter 60 (for example, between the IGBT elements Tr1 and Tr7).

Figure 3:
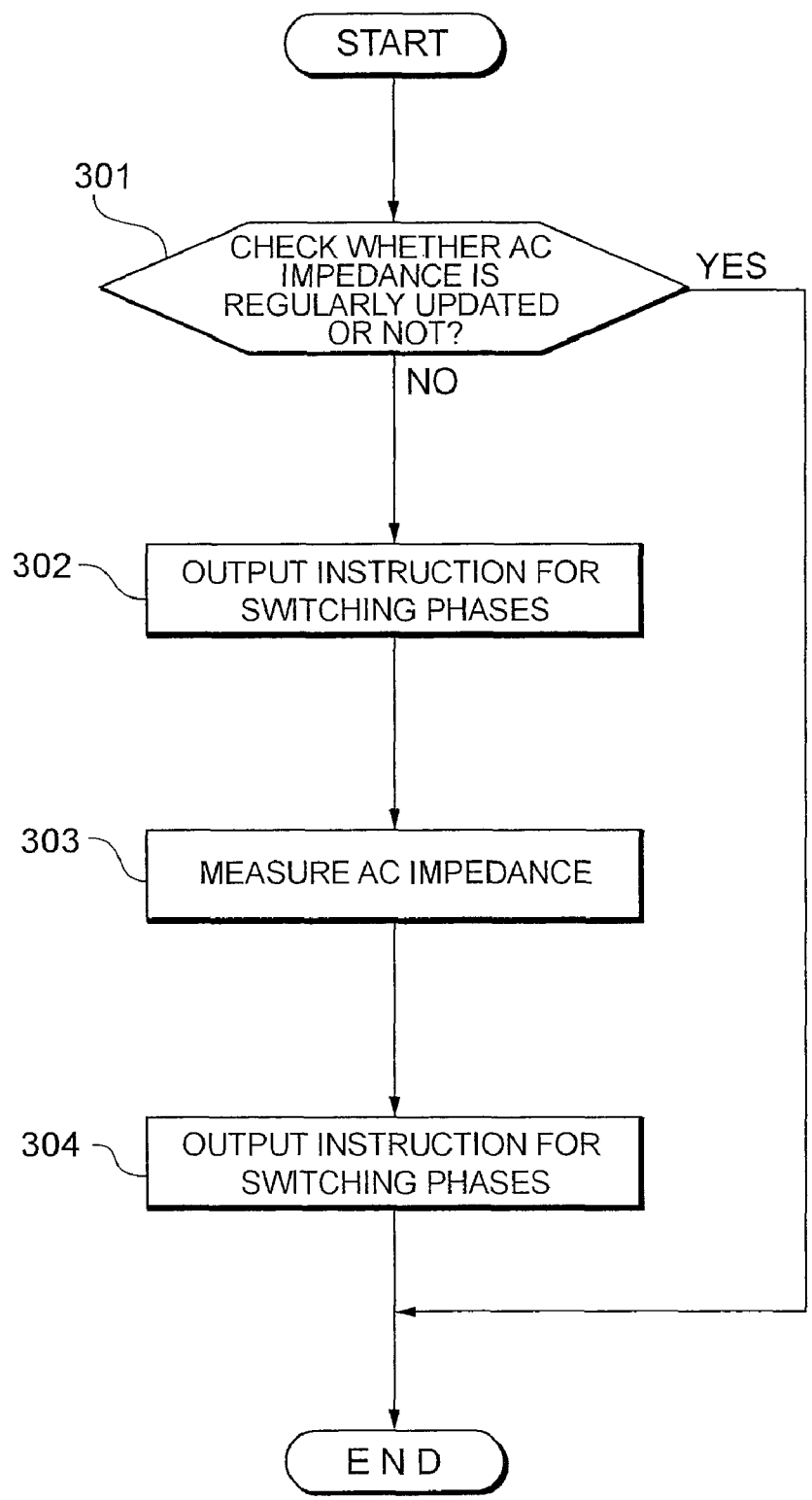
FIG. 3 is a flowchart illustrating a first method for measuring AC impedance.

Next, a first method for measuring the AC impedance of the fuel cell stack 20 will be described with reference to FIG. 3. The first method is premised on that the controller 80 controls the DC/DC converter 60 to measure the AC impedance of the fuel cell stack 20 at a constant period interval, and regularly updates the value of the AC impedance.

The controller 80 checks whether the value of the AC impedance is regularly updated or not (at step 301).

When the value of the AC impedance is regularly updated (YES at step 301), exit this processing routine to terminate because it is shown that the AC impedance is normally measured.

On the one hand, when the value of the AC impedance is not updated within a constant time frame (NO at step 301), the AC impedance may not be normally measured because the operating point of the DC/DC converter 60 may be inside of the lowered response capability region.

Then, in such a case, the controller 80 inhibits measurement of the AC impedance when the operating point of the DC/DC converter 60 is inside of the lowered response capability region, and outputs an instruction for switching the phases to the DC/DC converter 60 (step 302). For example, when the operating point of the DC/DC converter 60 under the single-phase operation is in the vicinity of −2.5 kW, it is possible to bring the operating point of the DC/DC converter 60 out of the lowered response capability region by switching an operational mode of the DC/DC converter 60 from the single-phase operation to the three-phase operation. Also, for example, when the operating point of the DC/DC converter 60 under the three-phase operation is in the vicinity of −5 kW, it is possible to bring the operating point of the DC/DC converter 60 out of the lowered response capability region by switching the operational mode of the DC/DC converter 60 from the three-phase operation to the single-phase operation.

After completion of switching the phases of the DC/DC converter 60, the controller 80 controls the DC/DC converter 60 to apply the AC signal to the fuel cell stack 20, and, based on a sensor output of the cell voltage detector 22 at that time, computes the AC impedance of the fuel cell stack 20 (step 303).

After completion of the measurement of the AC impedance, the controller 80 outputs, to the DC/DC converter 60, an instruction for switching the phases to return to the initial operational mode (step 304). For example, the operational mode of the DC/DC converter 60 under the single-phase operation is switched to the three-phase operation only for a measurement period of the AC impedance, and after completion of the measurement of the AC impedance, an instruction for returning to the initial single-phase operation is output. Also, for example, the operational mode of the DC/DC converter 60 under the three-phase operation is switched to the single-phase operation only for the measurement period of the AC impedance, and after completion of the measurement of the AC impedance, an instruction for returning to the initial three-phase operation is output.

As described above, when the operating point of the DC/DC converter 60 is inside of the lowered response capability region and measurement accuracy of the AC impedance lowers, then the measurement of the AC impedance is inhibited, the phases of the DC/DC converter 60 are switched, and the operating point of the DC/DC converter 60 is brought out of the lowered response capability region, thereby the measurement accuracy of the AC impedance can be enhanced.

In addition, the controller 80 and the cell voltage detector 22 function as an AC impedance measuring device (a device in which, when the operating point of the DC/DC converter 60 is outside of the lowered response capability region, then by detecting the response voltage of the cell upon applying the AC signal to the fuel cell stack 20, the AC impedance of the cell is measured, and on the contrary, when the operating point of the DC/DC converter 60 is inside of the lowered response capability region, then the measurement of the AC impedance is inhibited, the number of drive phases of the DC/DC converter 60 is switched, and the AC impedance of the cell is measured).

Figure 4:
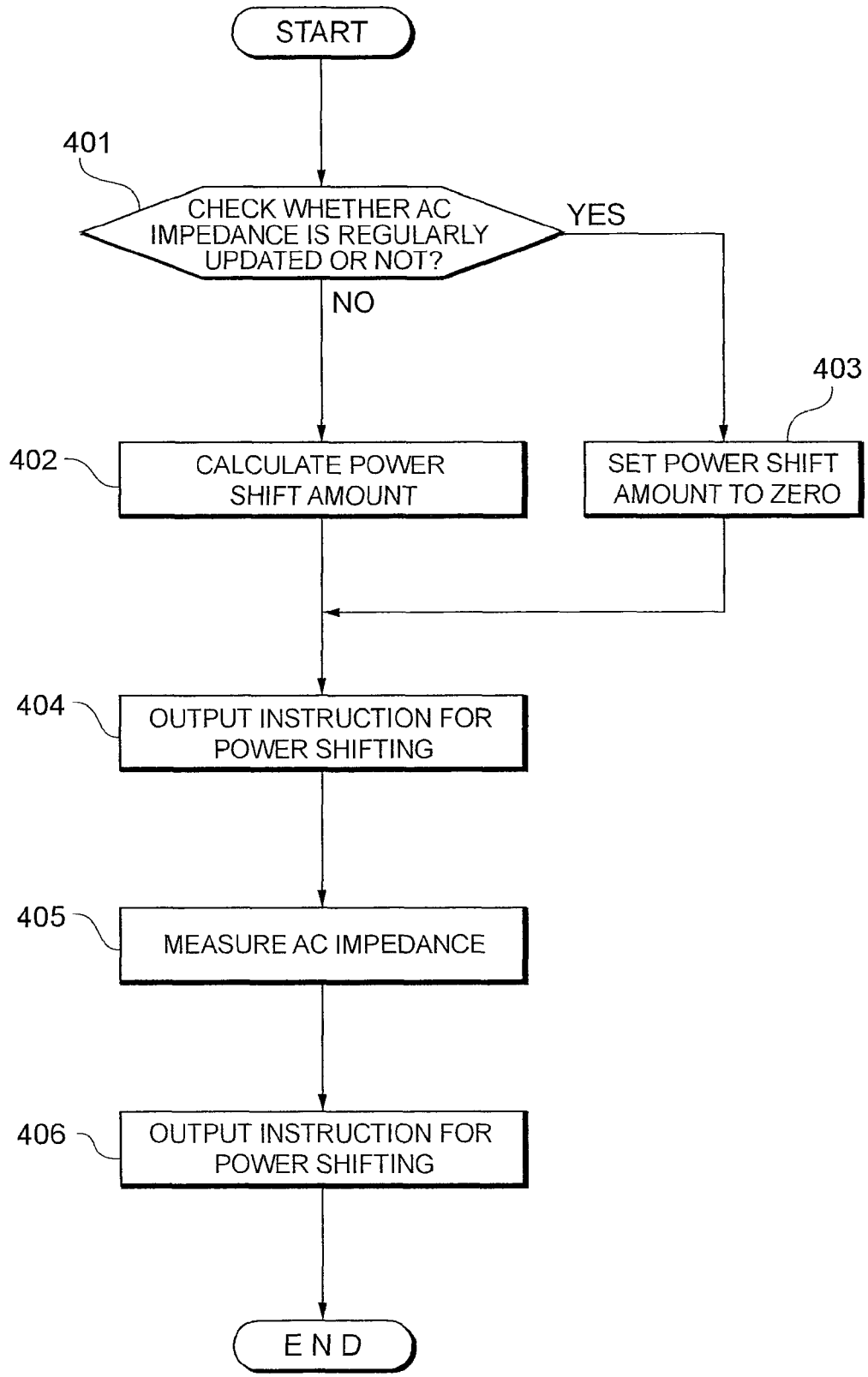
FIG. 4 is a flowchart illustrating a second method for measuring the AC impedance.

Next, a second method for measuring the AC impedance of the fuel cell stack 20 will be described with reference to FIG. 4. The second method is premised on that the controller 80 controls the DC/DC converter 60 to measure the AC impedance of the fuel cell stack 20 at a constant period interval and regularly updates the value of the AC impedance.

The controller 80 checks whether the value of the AC impedance is regularly updated or not (step 401).

When the value of the AC impedance is not updated within a constant time frame (NO at step 401), the AC impedance may not be normally measured because the operating point of the DC/DC converter 60 may be inside of the lowered response capability region.

Then, in such a case, the controller 80 inhibits measurement of the AC impedance when the operating point of the DC/DC converter 60 is inside of the lowered response capability region, and computes a power shift amount to bring the operating point of the DC/DC converter 60 out of the lowered response capability region (step 402). For the power shift amount to bring the operating point of the DC/DC converter 60 out of the lowered response capability region, a smaller one of a power shift amount minimally required to bring the operating point out of the lowered response capability region in the positive direction and a power shift amount in the negative direction may be set to a target value, and by the target value, the passing power is shifted in the positive direction or the negative direction.

For example, the case will be studied where the operating point of the DC/DC converter 60 under the three-phase operation is at 6 kW. Under the three-phase operation, the operational range of 5 kW±2 kW is the lowered response capability region, and to bring the operating point out of the lowered response capability region, a power shift amount of equal to or more than 1 kW in the positive direction or a power shift amount of equal to or more than 3 kW in the negative direction is necessary. Power shifting by 1 kW in the positive direction requires a smaller power shift amount than that by 3 kW in the negative direction, so that the power shifting by equal to or more than 1 kW in the positive direction is preferably carried out.

On the contrary, when the value of the AC impedance is regularly updated (YES at step 401), it is shown that the AC impedance is normally measured, and it is deduced that the operating point of the DC/DC converter 60 is in an operational range outside of the lowered response capability region. In such a case, it is not necessary to shift the operating point of the DC/DC converter 60, so that the power shift amount is set to zero (step 403).

The controller 80 outputs an instruction for power shifting to the DC/DC converter 60 to shift the passing power through the DC/DC converter 60 by the power shift amount set at step 402 or step 403 (step 404). At this time, when power shifting in the positive direction is carried out, surplus power may be stored in the secondary cell 50, consumed by the vehicle auxiliaries 70, or converted into thermal energy to be discharged in the atmosphere. When power shifting in the negative direction is carried out, power shortage may be replenished by the secondary cell 50.

After completion of the power shifting of the DC/DC converter 60, the controller 80 controls the DC/DC converter 60 to apply an AC signal to the fuel cell stack 20, and computes the AC impedance of the fuel cell stack 20, based on a sensor output of the cell voltage detector 22 at this time (step 405).

After completion of the measurement of the AC impedance, the controller 80 outputs, to the DC/DC converter 60, an instruction for power shifting to return to the initial passing power (step 406). For example, when the operating point of the DC/DC converter 60 under the three-phase operation with the operating point at 6 kW is moved due to power shifting by the power shift amount of 1 kW in the positive direction only for the measurement period of the AC impedance, an instruction for power shifting by 1 kW in the negative direction is output to return to the initial operating point after completion of the measurement of the AC impedance.

As described above, when the operating point of the DC/DC converter 60 is inside of the lowered response capability region and measurement accuracy of the AC impedance lowers, then the measurement of the AC impedance is inhibited, and by moving the operating point of the DC/DC converter 60 using power shifting, the operating point of the DC/DC converter 60 is brought out of the lowered response capability region, thereby the measurement accuracy of the AC impedance can be enhanced.

In addition, the controller 80 and the cell voltage detector 22 function as an AC impedance measuring device (a device in which, when the operating point of the DC/DC converter 60 is outside of the lowered response capability region, then by detecting the response voltage of the cell upon applying the AC signal to the fuel cell stack 20, the AC impedance of the cell is measured, and on the contrary, when the operating point of the DC/DC converter 60 is inside of the lowered response capability region, then the measurement of the AC impedance is inhibited, and by shifting the passing power through the DC/DC converter 60, the operating point of the DC/DC converter 60 is brought out of the lowered response capability region, and the AC impedance of the cell is measured).

Figure 5:
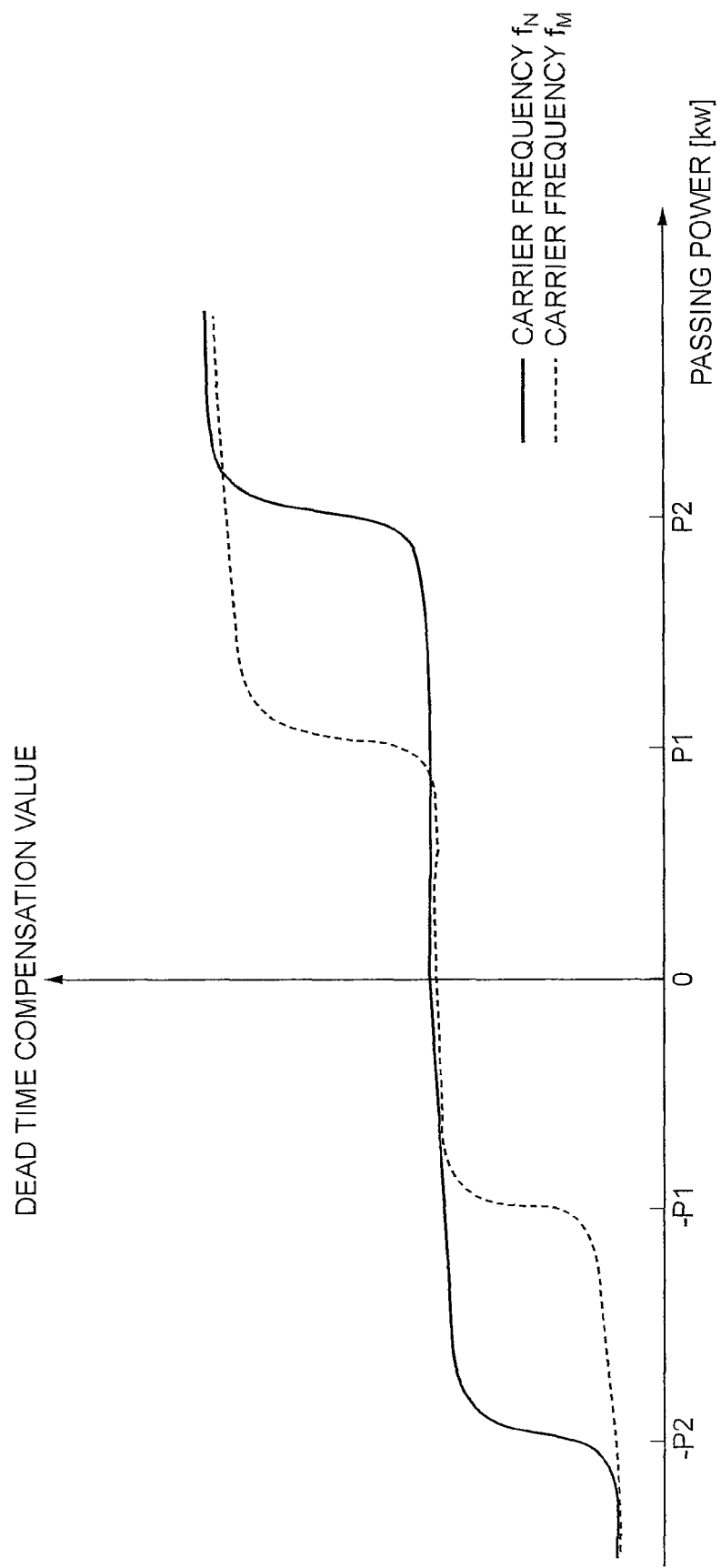
FIG. 5 is a graph illustrating the relation between the passing power and the dead time compensation value of a DC/DC converter.

FIG. 5 is a graph illustrating the relation between the passing power and the dead time compensation value of the DC/DC converter 60. The solid line shows a graph when the DC/DC converter 60 is switching-controlled by a control signal having a carrier frequency $f_N$, and it is seen that there are the lowered response capability regions where the dead time compensation value largely changes, in an operational range in the vicinity of the passing power of +P2 and in an operational range in the vicinity of that of −P2. The dotted line shows a graph when the DC/DC converter 60 is switching-controlled by a control signal having a carrier frequency $f_M$, and it is seen that there are the lowered response capability regions where the dead time compensation value largely changes, in an operational range in the vicinity of the passing power of +P1 and in an operational range in the vicinity of that of −P1. From the graphs, it may be understood that positions of the lowered response capability regions change dependent on the carrier frequency. The reason is that because a dead time value is a constant value independent of the carrier period and there is change in proportion of the dead time constituting the carrier period when the carrier frequency is changed, then corresponding to the change in proportion, the dead time compensation value changes.

Figure 6:
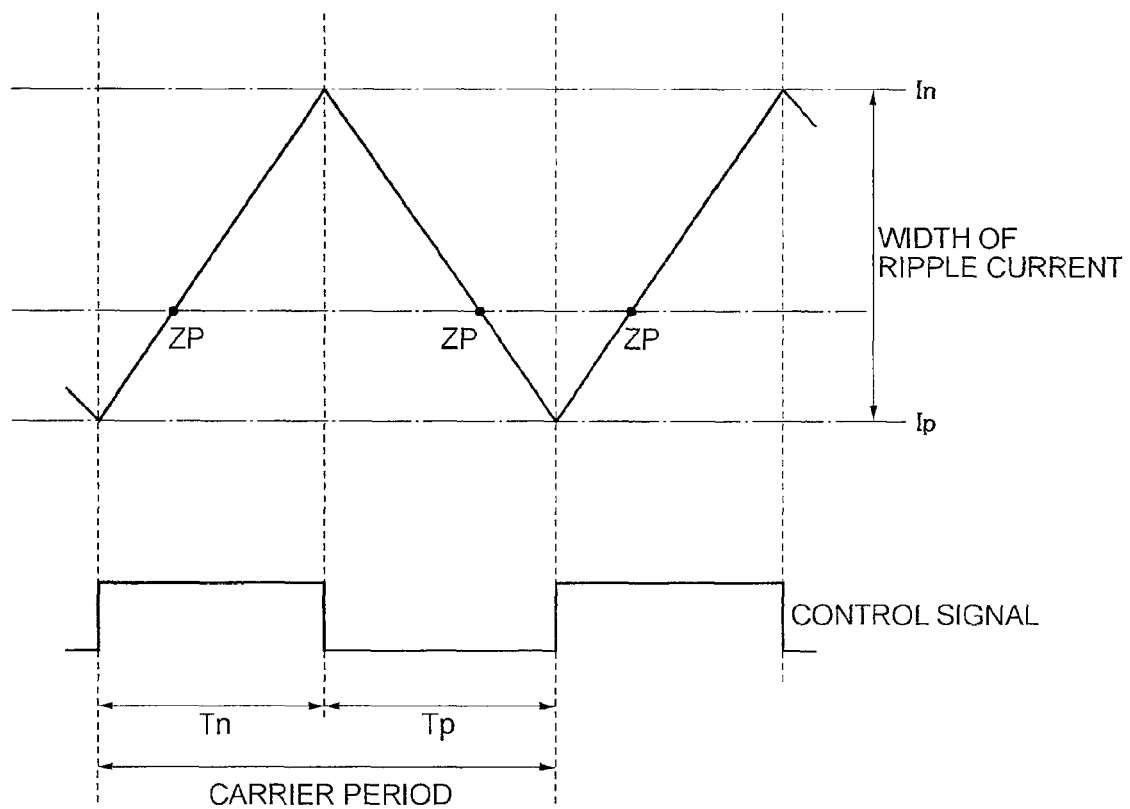
FIG. 6 is a schematic diagram illustrating the relation between a control signal for switching-controlling a DC/DC converter and a ripple current flowing in a reactor.

FIG. 6 illustrates the relation between the control signal for switching-controlling the IGBT elements Tr1 to Tr2 in the DC/DC converter 60 and a ripple current flowing in the reactors L1 to L3. For the purpose of convenience of description, the case of the single-phase operation will be described as an example, and the time Tn shows a time in which the IGBT elements Tr1 and Tr10 are on, and the time Tp shows a time in which the IGBT elements Tr4 and Tr7 are on. The carrier period equals the sum of Tn and Tp. When the maximal value of the ripple current is In and the minimal value is Ip, a width of the ripple current equal to In−Ip. A point at which the ripple current crosses a zero level is indicated by ZP (hereinafter, called "zero-crossing point").

If the zero-crossing point ZP is present, the direction of the ripple current (sign) is frequently inverted, and then voltage control performance of the DC/DC converter 60 is considerably lowered. Then, the zero-crossing point ZP appears as a region where the dead time compensation value largely changes, that is, the lowered response capability region. On the one hand, when the maximal value In has a negative value, or the minimal value Ip has a positive value, then the zero-crossing ZP point is not present, and the voltage control performance of the DC/DC converter 60 is better. Further, when the zero-crossing point ZP is present at the center of the width of the ripple current, the sign of the ripple current is symmetrically inverted with respect to the zero-crossing point ZP, and the voltage control performance of the DC/DC converter 60 is better.

As shown, when the carrier frequency is increased, the times Tn and Tp are shortened, so that it may be understood that the width of the ripple current is shortened. On the contrary, when the carrier frequency is decreased, the times Tn and Tp are prolonged, so that the width of the ripple current is prolonged. When the width of the ripple current is changed, the point at which the ripple current crosses a zero level is also changed, so that by changing the carrier frequency, the operating point of the DC/DC converter 60 can be brought out of the lowered response capability region.

Figure 7:
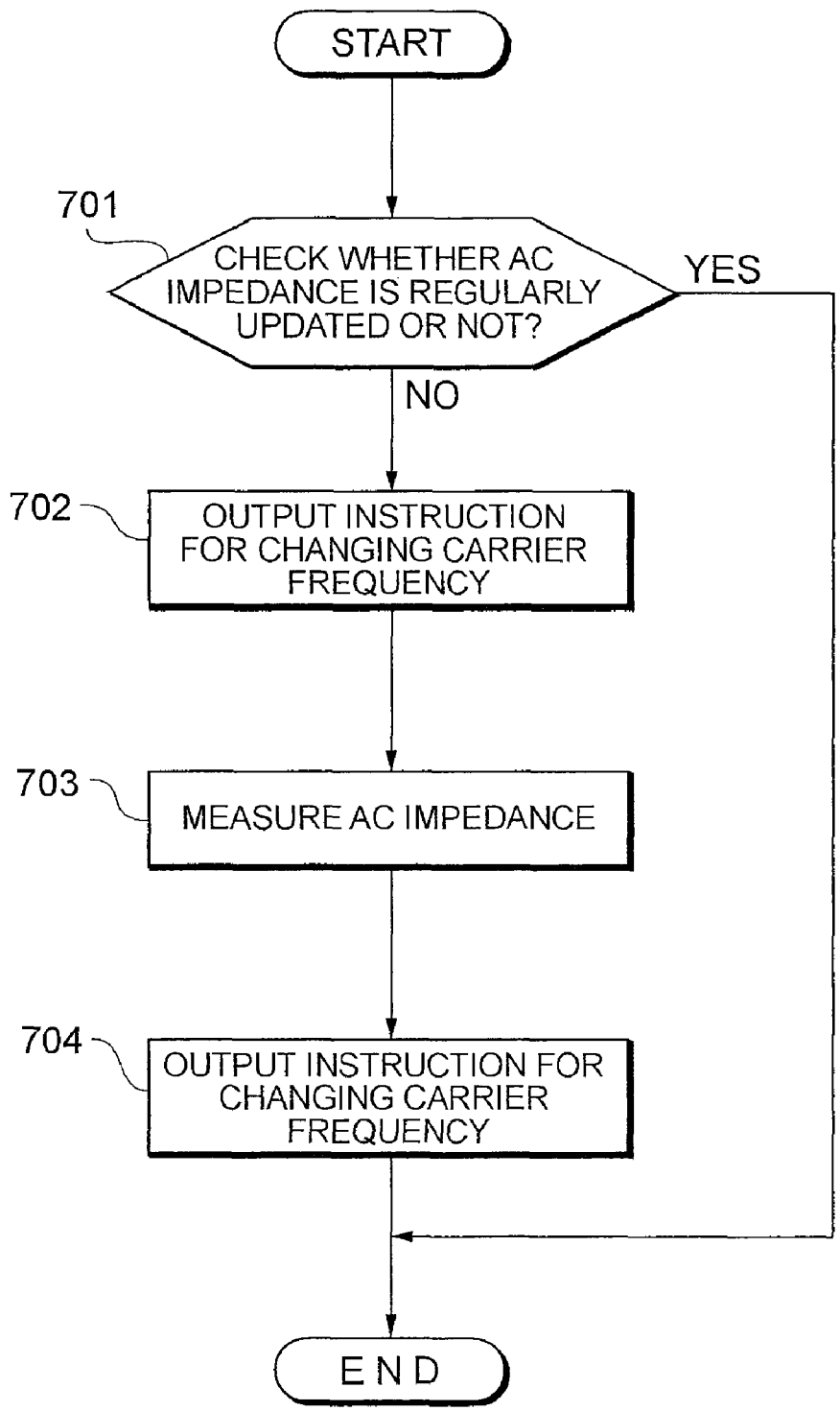
FIG. 7 is a flowchart illustrating a third method for measuring the AC impedance.

Next, a third method for measuring the AC impedance of the fuel cell stack 20 will be described with reference to FIG. 7. The third method is premised on that the controller 80 controls the DC/DC converter 60 to measure the AC impedance of the fuel cell stack 20 at a constant period interval and regularly updates the value of the AC impedance.

The controller 80 checks whether the value of the AC impedance is regularly updated or not (step 701).

When the value of the AC impedance is regularly updated (YES at step 701), it is shown that the AC impedance is normally measured, then exit this processing routine to terminate.

On the contrary, when the value of the AC impedance is not updated within a constant time frame (NO at step 701), the AC impedance may not be normally measured because the operating point of the DC/DC converter 60 may be inside of the lowered response capability region.

Then, in such a case, the controller 80 inhibits measurement of the AC impedance when the operating point of the DC/DC converter 60 is inside of the lowered response capability region, and outputs, to the DC/DC converter 60, an instruction to change the carrier frequency so as to bring the operating point of the DC/DC converter 60 out of the lowered response capability region (step 702).

After completion of switching the carrier frequency, the controller 80 controls the DC/DC converter 60 to apply an AC signal to the fuel cell stack 20, and then computes the AC impedance of the fuel cell stack 20, based on a sensor output of the cell voltage detector 22 at this time (step 703).

After completion of the measurement of the AC impedance, the controller 80 outputs, to the DC/DC converter 60, an instruction to return to the initial carrier frequency (step 704). For example, when the carrier frequency is temporarily changed from $f_N$ to $f_M$ only for a measurement period of the AC impedance, an instruction to return to the initial carrier frequency $f_N$ is output to the DC/DC converter 60 after completion of the measurement of the AC impedance.

As described above, when the operating point of the DC/DC converter 60 is inside of the lowered response capability region and measurement accuracy of the AC impedance lowers, then the measurement of the AC impedance is inhibited, and by changing the carrier frequency of the control signal for controlling a switching operation of the DC/DC converter 60, the operating point of the DC/DC converter 60 is brought out of the lowered response capability region, thereby the measurement accuracy of the AC impedance can be enhanced.

In addition, the controller 80 and the cell voltage detector 22 function as an AC impedance measuring device (a device in which, when the operating point of the DC/DC converter 60 is outside of the lowered response capability region, then by detecting the response voltage of the cell upon applying the AC signal to the fuel cell stack 20, the AC impedance of the cell is measured, and on the contrary, when the operating point of the DC/DC converter 60 is inside of the lowered response capability region, then by changing the carrier frequency of the control signal for controlling a switching operation of the DC/DC converter 60, the operating point of the DC/DC converter 60 is brought out of the lowered response capability region, and the AC impedance of the cell is measured).

INDUSTRIAL APPLICABILITY

According to the present invention, the AC impedance of a fuel cell stack can be accurately measured.

The invention claimed is:

1. A fuel cell system, comprising:
   a DC/DC converter for increasing and lowering an output voltage of a fuel cell stack formed by laminating a plurality of cells;
   a controller programmed to drive the DC/DC converter to apply an AC signal to the fuel cell stack; and
   a detector for detecting a response voltage of the cell upon applying the AC signal to the fuel cell stack, wherein the controller is programmed to measure AC impedance of the cell from the detected response voltage of the cell upon applying the AC signal to the fuel cell stack when the DC/DC converter operates outside of a lowered response capability region, and wherein the controller is programmed to inhibit measurement of the AC impedance of the cell when the DC/DC converter operates inside of the lowered response capability region, and wherein the lowered response capability region corresponds to an operating region of the DC/DC converter where a dead time compensation value varies greatly as a function of power passing through the DC/DC converter.

2. The fuel cell system according to claim 1, wherein the DC/DC converter is a multiphase converter, and the controller is programmed to switch the number of drive phases of the DC/DC converter to measure the AC impedance of the cell, when the DC/DC converter operates inside of the lowered response capability region and measurement of the AC impedance is requested.

3. The fuel cell system according to claim 1, wherein the controller is programmed to shift a passing power through the DC/DC converter to operate the DC/DC converter out of the lowered response capability region, and is further programmed to measure the AC impedance of the cell when the DC/DC converter operates inside of the lowered response capability region and measurement of the AC impedance is requested.

4. The fuel cell system according to claim 1, wherein the controller is programmed to change a carrier frequency of a control signal for controlling a switching operation of the DC/DC converter to operate the DC/DC converter out of the lowered response capability region, and is further programmed to measure the AC impedance of the cell when the operating point of the DC/DC converter is inside of the lowered response capability region and measurement of the AC impedance is requested.

* * * * *

UNITED STATES PATENT AND TRADEMARK OFFICE
CERTIFICATE OF CORRECTION

PATENT NO. : 8,268,495 B2  
APPLICATION NO. : 12/303518  
DATED : September 18, 2012  
INVENTOR(S) : Kota Manabe et al.

Page 1 of 1

It is certified that error appears in the above-identified patent and that said Letters Patent is hereby corrected as shown below:

| Column | Line | |
|---|---|---|
| 4 | 49 | Change "a 1200 phase" to --a 120° phase--. |

Signed and Sealed this  
Fifth Day of February, 2013

Teresa Stanek Rea  
*Acting Director of the United States Patent and Trademark Office*